(12) United States Patent
Muzquiz et al.

(10) Patent No.: US 8,746,279 B2
(45) Date of Patent: Jun. 10, 2014

(54) PRESSURE CONTROL VALVE

(75) Inventors: Guillermo Muzquiz, CD. Juarez (MX); Jorge A. Campuzano, El Paso, TX (US); Leonel A. Barrera, CD. Juarez (MX)

(73) Assignee: Delphi Technologies, Inc., Troy, MI (US)

( * ) Notice: Subject to any disclaimer, the term of this patent is extended or adjusted under 35 U.S.C. 154(b) by 341 days.

(21) Appl. No.: 13/232,324

(22) Filed: Sep. 14, 2011

(65) Prior Publication Data
US 2013/0061958 A1  Mar. 14, 2013

(51) Int. Cl.
*F16K 11/07* (2006.01)

(52) U.S. Cl.
USPC .................. 137/625.26; 137/596.17

(58) Field of Classification Search
USPC ............... 137/596.17, 596, 625.26, 596.13
See application file for complete search history.

(56) References Cited

U.S. PATENT DOCUMENTS

| | | | |
|---|---|---|---|
| 5,127,435 A * | 7/1992 | Takata et al. | 137/596.17 |
| 5,894,860 A * | 4/1999 | Baldauf et al. | 137/625.65 |
| 6,619,616 B1 * | 9/2003 | Sudani et al. | 137/596.17 |
| 6,904,934 B2 * | 6/2005 | Runge et al. | 137/596.17 |
| 7,766,040 B2 * | 8/2010 | Bamber | 137/625.26 |
| 8,231,818 B2 * | 7/2012 | Bamber | 137/625.26 |
| 8,528,599 B2 * | 9/2013 | Morgan et al. | 137/625.65 |
| 2002/0100890 A1 | 8/2002 | Moreno et al. | |
| 2004/0211472 A1 | 10/2004 | Weber | |
| 2005/0051222 A1 | 3/2005 | Burrola et al. | |
| 2005/0061374 A1 * | 3/2005 | Hameister et al. | 137/596.17 |
| 2005/0178992 A1 | 8/2005 | Barron et al. | |
| 2005/0184262 A1 | 8/2005 | Barron et al. | |
| 2006/0097209 A1 | 5/2006 | Barron et al. | |
| 2006/0272714 A1 | 12/2006 | Carrillo et al. | |
| 2009/0065075 A1 * | 3/2009 | Schmidt et al. | 137/596.17 |

* cited by examiner

*Primary Examiner* — Craig Schneider
*Assistant Examiner* — Craig J Price
(74) *Attorney, Agent, or Firm* — Thomas N. Twomey

(57) ABSTRACT

A valve assembly includes a housing with a housing control bore, a supply port in selective fluid communication with the housing control bore for receiving working fluid from a working fluid source, a control port in fluid communication with the housing control bore for communicating the working fluid to and from a working device switchable from a first mode of operation to a second mode of operation at a predetermined pressure, and a vent port in fluid communication with the housing control bore for selectively returning the working fluid to the working fluid source. A supply valve member is selectively seated and unseat with a supply valve seat. A bleed orifice is provided for communicating the working fluid from the supply port to the control port at a second pressure that is less than the predetermined pressure when the supply valve member is seated with the supply valve seat.

15 Claims, 3 Drawing Sheets

PRESSURE CONTROL VALVE

TECHNICAL FIELD OF INVENTION

The present invention relates to on/off fluid control valves; and more particularly, to such valves as are commonly employed for switching two-step mechanisms in the valve train system of internal combustion engines; and most particularly, to on/off fluid control valves which improve the response time of the two-step mechanisms by priming the on/off fluid control valve and oil galleries.

BACKGROUND OF INVENTION

On/off fluid control valves for controllably diverting the flow of fluids are well known which include a supply port, a control port, and a vent port. In a typical on/off fluid control valve, a valve member, for example a ball, is selectively seated and unseated from a valve seat for respectively preventing and allowing a high pressure working fluid from reaching a working device. In a high pressure mode of operation, a solenoid of the on/off fluid control valve axially positions a plunger to urge the ball to be unseated from the valve seat. In this way, high pressure working fluid from the supply port is communicated to the working device through the control port and working fluid is prevented from exiting the on/off fluid control valve through the vent port. In a venting mode of operation, the plunger is positioned axially to allow high pressure working fluid to seat the ball against the valve seat and to allow working fluid to pass from the control port to the vent port. In this way, high pressure working fluid is prevented from being communicated to the working device and working fluid is vented from the working device through the vent port.

A common usage for an on/off fluid control valve is to variably actuate engine control subsystems such as camshaft phasers and multi-step or valve deactivation mechanisms. In a two step valve mechanism, for example, the mechanism selects the engine intake valve lift profile (low or high) of an intake valve camshaft using a hydraulically activated roller finger follower (RFF).

In a simple configuration of this example, the on/off fluid control valve supplies high pressure oil, typically from an engine-driven oil pump, to activate the RFF, and shuts off the oil supply to deactivate and vent oil from the RFF. However, when the on/off fluid control valve is in the venting mode of operation for a sufficient amount of time, oil may vent from the on/off fluid control valve and an oil gallery leading from the control port to the RFF. This may lead to air taking the place previously occupied by oil. Consequently, when the on/off fluid control valve is placed in the high pressure mode of operation, a delay may take place in allowing pressurized oil from reaching the RFF because the air must first be purged.

What is needed is an on/off fluid control valve which keeps fluid passages free of air when the on/off fluid control valve is placed in the venting mode of operation.

SUMMARY OF THE INVENTION

Briefly described, a valve assembly is provided for receiving a working fluid from a working fluid source and then communicating the working fluid to and from a working that is switchable between a first mode of operation to a second mode of operation at a predetermined pressure of the working fluid. The valve assembly includes a housing with a housing control bore, a supply port in selective fluid communication with the housing control bore for receiving working fluid from the working fluid source, a control port in fluid communication with the housing control bore for communicating the working fluid to and from the working device, and a vent port in fluid communication with the housing control bore for selectively returning the working fluid to the working fluid source. A valve seat assembly is disposed within the housing control bore and includes a supply valve seat. A supply valve member is selectively seated and unseated with the supply valve seat such that working fluid is passed through the valve seat assembly to the control port at or above the predetermined pressure when the supply valve member is not seated with the supply valve seat and such that the working fluid is not passed through the valve seat assembly to the control port at or above the predetermined pressure when the supply valve member is seated with the supply valve seat. A bleed orifice is provided for communicating the working fluid from the supply port to the control port at a second pressure that is less than the predetermined pressure when the supply valve member is seated with the supply valve seat.

BRIEF DESCRIPTION OF DRAWINGS

This invention will be further described with reference to the accompanying drawings in which.

DETAILED DESCRIPTION OF INVENTION

Figure 1:
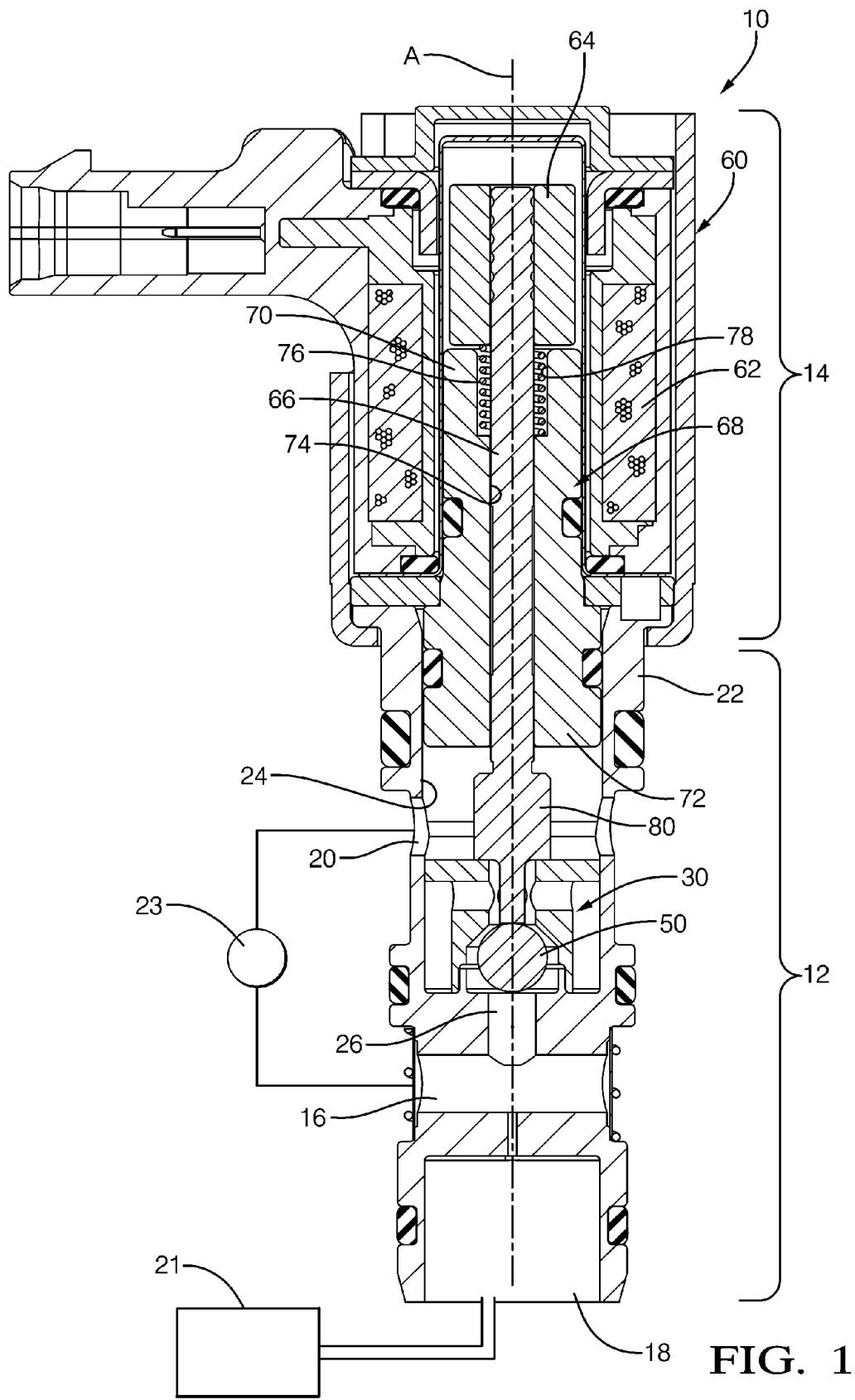
FIG. 1 is a cross section of a valve assembly in accordance with the present invention.
Figure 2:
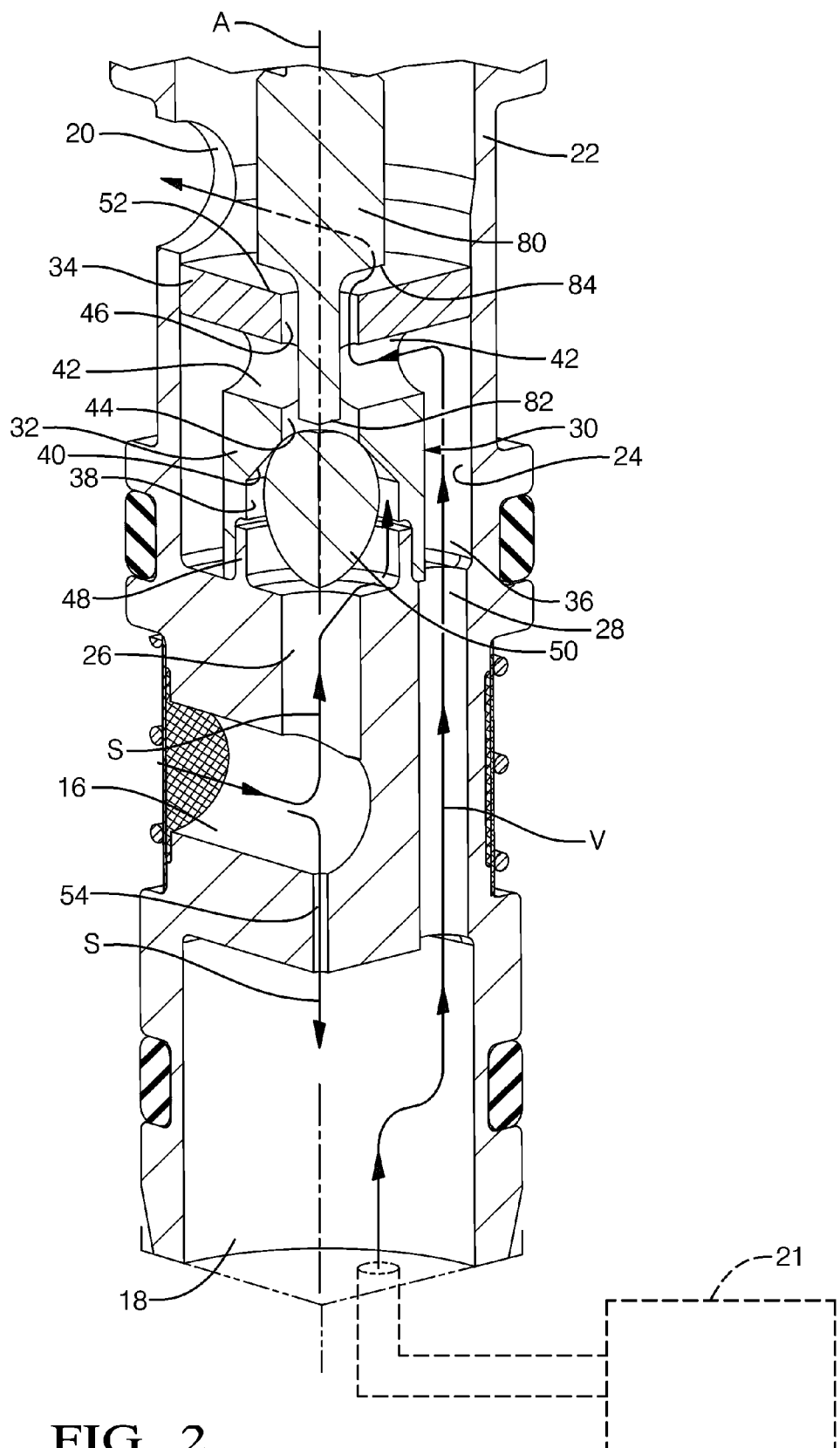
FIG. 2 is a cross section of a hydraulic section of the valve assembly of FIG. 1 positioned in a venting mode of operation.
Figure 3:
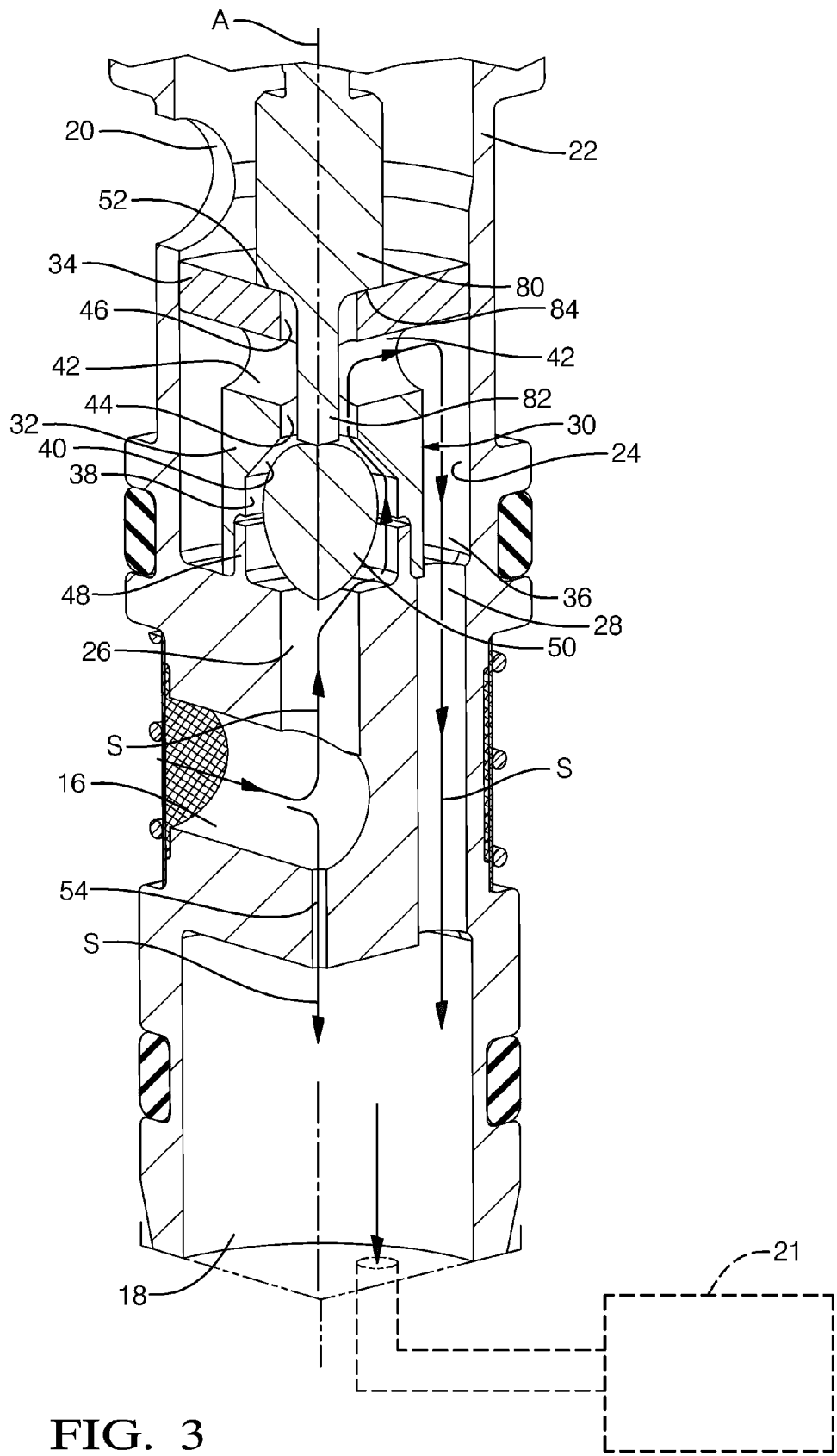
FIG. 3 is the cross section of the hydraulic section of FIG. 2 positioned in a high pressure mode of operation.

In accordance with a preferred embodiment of this invention and referring to FIGS. 1-3, valve assembly 10 is shown which is switchable between a high pressure mode of operation (FIGS. 1 and 3) and a venting mode of operation (FIG. 2). Valve assembly 10 includes hydraulic section 12 which is connected to actuator section 14. Actuator section 14 affects fluid communication between supply port 16 and control port 18 and between control port 18 and exhaust port 20. In this way, high pressure working fluid is selectively supplied to or vented from working device 21 which is switchable between a first mode of operation and a second mode of operation at a predetermined pressure. Working device 21 is placed in the first mode of operation when valve assembly 10 is in the venting mode of operation high while working device 21 is placed in the second mode of operation when valve assembly 10 is placed in the high pressure mode of operation.

Still referring to FIGS. 1-3, hydraulic section 12 includes housing 22 extending along central housing axis A. Housing 22 may be preferably made of plastic, but may alternatively be made of metal. Control port 18 extends axially part way into housing 22 from the end of housing 22 distal from actuator section 14. Housing control bore 24 extends axially into housing 22 from the end of housing 22 proximal to actuator section 14. Supply port 16 extends radially through housing 22 between control port 18 and housing control bore 24 for receiving working fluid from working fluid source 23. Housing supply passage 26 extends axially through housing 22 from supply port 16 to housing control bore 24 for providing fluid communication therebetween. Housing control bore 24 and housing supply passage 26 may be coaxial with central housing axis A. Housing control/exhaust passage 28 extends axially through housing 22 from housing control bore 24 to control port 18 for providing fluid communication therebetween. Housing control/vent passage 28 is radially offset from housing supply passage 26. Exhaust port 20 extends radially through housing 22 from housing control bore 24.

Valve seat assembly 30 is disposed within housing control bore 24. Valve seat assembly 30 may be preferably made of plastic, but may alternatively be made of metal. Valve seat assembly 30 includes smaller diameter section 32 which is sized to be smaller in diameter than housing control bore 24. Valve seat assembly 30 also includes larger diameter section 34 which extends radially outward from smaller diameter section 32 and which is sized to be press fit within housing control bore 24 to substantially prevent working fluid from passing between the interface of housing control bore 24 and larger diameter section 34 by circumferentially sealing with housing control bore 24. An insignificant amount of working fluid that does not affect the operation of valve assembly 10 or working device 21 may pass between the interface of housing control bore 24 and larger diameter section 34 while still being considered to substantially prevent working fluid from passing between the interface of housing control bore 24 and larger diameter section 34. Larger diameter section 34 is positioned axially between exhaust port 20 and the bottom of housing control bore 24. Annular control chamber 36 is defined radially between smaller diameter section 32 and housing control bore 24 and axially between larger diameter section 34 and the bottom of housing control bore 24. Housing control/vent passage 28 provides fluid communication between annular control chamber 36 and control port 18.

Valve seat assembly 30 includes valve seat assembly bore 38 which extends axially part way into smaller diameter section 32 and which is terminated by conical supply valve seat 40. Valve seat control/exhaust passages 42 extend radially through valve seat assembly 30 axially between large diameter section 34 and conical supply valve seat 40 and are in fluid communication with valve seat assembly bore 38 through valve seat supply passage 44 which is coaxial with conical supply valve seat 40. Valve seat control/vent passages 42 provide fluid communication from valve seat supply passage 44 to annular control chamber 36. Valve seat assembly 30 also includes valve seat vent passage 46 which extends axially through larger diameter section 34 to provide fluid communication from valve seat control/vent passages 42 to exhaust port 20. Valve seat vent passage 46 may be coaxial with conical supply valve seat 40.

The end of smaller diameter section 32 distal from larger diameter section 34 is sealed against housing 22. This may be accomplished by providing housing 22 with raised annular ring 48 which extends axially away from the bottom of housing control bore 24. Raised annular ring 48 radially surrounds housing supply passage 26 and is located radially between housing supply passage 26 and housing control/vent passage 28. Raised annular ring 48 may be sized to interface with valve seat assembly bore 38 with a press fit such to substantially prevent working fluid passing between the interface of valve seat assembly bore 38 and raised annular ring 48. An insignificant amount of working fluid that does not affect the operation of valve assembly 10 or working device 21 may pass between the interface of raised annular ring 48 and valve seat assembly bore 38 still being considered to substantially prevent working fluid from passing between the interface of raised annular ring 48 and valve seat assembly bore 38. Alternatively, but not shown, raised annular ring 48 may be eliminated, and the sealing function between smaller diameter section 32 and housing 22 may be accomplished by bonding the axial end of smaller diameter section 32 distal from larger diameter section 34 to the bottom of housing control bore 24. Bonding may be accomplished, for example, by adhesives or welding.

A supply valve member, shown as ball 50, is disposed within valve seat assembly bore 38 axially between conical supply valve seat 40 and the bottom of housing control bore 24. Ball 50 is selectively seated and selectively unseated from conical supply valve seat 40 for respectively preventing and permitting fluid communication from supply port 16 to annular control chamber 36 through valve seat supply passage 44. Seating and unseating of ball 50 from conical supply valve seat 40 will be described in more detail later.

The axial end of larger diameter section 34 distal from smaller diameter section 32 defines vent valve seat 52. Vent valve seat 52 will be discussed in more detail later in the operation of valve assembly 10.

Bleed orifice 54 extends axially through housing 22 from supply port 16 to control port 18. Bleed orifice 54 is sized sufficiently small to produce a pressure differential between supply port 16 and control port 18. In this way, working fluid is supplied to control port 18 even when ball 50 is seated on conical supply valve seat 40. However, due to the pressure differential created by bleed orifice 54, the working fluid supplied to control port 18 through bleed orifice 54 is less than the predetermined pressure needed to cause working device 21 to switch from the first mode of operation to the second mode of operation. Working fluid that enters control port 18 through bleed orifice 54 when ball 50 is seated on conical supply valve seat 40 (FIG. 2) is passed to exhaust port 20 through housing control/vent passage 28, annular control chamber 36, valve seat control/vent passages 42, and valve seat vent passage 46. Additionally, some working fluid may be communicated to working device 21 for lubrication of working device 21. The continuous supply of working fluid to control port 18 through bleed orifice 54 assures that air is purged from valve assembly 10 and the passage connecting valve assembly 10 to working device 21, thereby decreasing the response time of valve assembly 10 when ball 50 is unseated from conical supply valve seat 40 to provide high pressure working fluid to working device 21.

Actuator section 14 includes solenoid 60 having coil 62 and axially moveable armature 64 located coaxially within coil 62. Armature 64 is fixed to plunger 66 such that axial movement of armature 64 results in axial movement of plunger 66 between a high pressure position and a vent position. Guide bushing 68 includes guide bushing solenoid end 70 which is fixed coaxially within coil 62. Guide bushing solenoid end 70 is a magnetic pole which is part of the magnetic circuit of solenoid 60. Guide bushing 68 also includes guide bushing hydraulic end 72 which is fixed coaxially within housing control bore 24. Guide bushing bore 74 extends axially through guide bushing 68 coaxial with coil 62 and housing control bore 24 to closely guide plunger 66, thereby substantially preventing radial movement of plunger 66.

Solenoid 60 also includes return spring 76 which is located partly within spring pocket 78 of guide bushing 68. Spring pocket 78 extends axially part way into guide bushing solenoid end 70 coaxial with guide bushing bore 74. Return spring 76 biases armature 64 away from guide bushing 68.

When coil 62 is energized with an electric current, a magnetic field is generated resulting in an attractive force between armature 64 and guide bushing 68. Consequently, armature 64 is moved axially toward guide bushing 68, thereby compressing return spring 76. Conversely, when coil 62 is not energized with an electric current, armature 64 is moved axially away from guide bushing 68 by the force of return spring 76. Solenoids and their operation are well known to those skilled in the art and will not be further discussed herein.

Plunger 66 extends axially through guide bushing bore 74 and into housing control bore 24. Plunger 66 includes vent valve member 80 which extends radially outward from plunger 66. Vent valve member 80 is located axially between guide bushing 68 and valve seat assembly 30. Plunger 66 also includes a supply valve actuation section shown as ball actuation section 82 which extends axially away from vent valve member 80 toward valve seat assembly 30 and which extends axially through valve seat vent passage 46 and axially into valve seat supply passage 44. Ball actuation section 82 is sized to provide radial clearance between valve seat vent passage 46 and valve seat supply passage 44 to allow working fluid to flow between ball actuation section 82 and valve seat vent passage 46 and between ball actuation section 82 and valve seat supply passage 44.

Exhaust valve shoulder 84 is the surface of plunger 66 connecting vent valve member 80 to ball actuation section 82. Exhaust valve shoulder 84 may be substantially parallel to vent valve seat 52. Exhaust valve shoulder 84 will be discussed in more detail later in the operation of valve assembly 10.

In operation and referring to FIG. 2, valve assembly 10 is shown in the venting mode of operation. In the venting mode of operation, solenoid 60 (FIG. 1) is not energized with an electric current. In this way, plunger 66 is urged away from valve seat assembly 30 to be placed in the vent position. When plunger 66 is urged away from valve seat assembly 30, ball 50 is seated against conical supply valve seat 40 by the pressurized working fluid supplied through supply port 16 and housing supply passage 26. As a result, the pressurized working fluid is substantially prevented from passing through valve seat supply passage 44. An insignificant amount of working fluid that does not affect the operation of valve assembly 10 or working device 21 may pass between the interface of ball 50 and conical supply valve seat 40 while still being considered to substantially prevent working fluid from passing through valve seat supply passage 44. At the same time, exhaust valve shoulder 84 is axially separated from vent valve seat 52. As a result, working fluid is vented from working device 21 through control port 18, housing control/vent passage 28, annular control chamber 36, valve seat control/vent passages 42, valve seat vent passage 46, and exhaust port 20. Also at the same time, working fluid entering supply port 16 is supplied directly to control port 18 at a pressure that is less than the predetermined pressure through bleed orifice 54 to keep valve assembly 10 and the passage connecting valve assembly 10 to working device 21 substantially free of air. Arrows S are provided to show the path taken by the supplied working fluid and arrows V are provided to show the path taken by the vented working fluid.

In operation and referring to FIG. 3, valve assembly 10 is shown in the high pressure mode of operation. In the high pressure mode of operation, solenoid 60 (FIG. 1) is energized with an electric current. In this way, plunger 66 is move axially toward valve seat assembly 30 until exhaust valve shoulder 84 seats on vent valve seat 52 to be placed in the high pressure position. In this way, working fluid is substantially prevented from passing through valve seat vent passage 46 to exhaust port 20. An insignificant amount of working fluid that does not affect the operation of valve assembly 10 or working device 21 may pass between the interface of exhaust valve shoulder 84 and vent valve seat 52 while still being considered to substantially prevent working fluid from passing through valve seat vent passage 46 to exhaust port 20. At the same time, ball actuation section 82 acts axially on ball 50 to unseat ball 50 from conical supply valve seat 40. In this way, high pressure working fluid from supply port 16 is communicated to working device 21 at or above the predetermined pressure through housing supply passage 26, valve seat assembly bore 38, valve seat supply passage 44, valve seat control/vent passages 42, annular control chamber 36, housing control/vent passage 28, and control port 18. Also at the same time, working fluid entering supply port 16 may also be supplied directly to control port 18 through bleed orifice 54. Arrows S are provided to show the path taken by the supplied working fluid.

While this invention has been described in terms of preferred embodiments thereof, it is not intended to be so limited, but rather only to the extent set forth in the claims that follow.

We claim:

1. A valve assembly for receiving working fluid from a working fluid source and then communicating said working fluid to and from a working device that is switchable from a first mode of operation to a second mode of operation at a predetermined pressure of said working fluid, said valve assembly comprising:
    a housing with a housing control bore, a supply port in selective fluid communication with said housing control bore for receiving said working fluid from said working fluid source, a control port in fluid communication with said housing control bore for communicating said working fluid to and from said working device, and a vent port in fluid communication with said housing control bore for selectively returning said working fluid to said working fluid source;
    a valve seat assembly disposed within said housing control bore, said valve seat assembly having a supply valve seat;
    a supply valve member selectively seated and unseated with said supply valve seat such that said working fluid is passed through said valve seat assembly to said control port at or above said predetermined pressure when said supply valve member is not seated with said supply valve seat and such that said working fluid is not passed through said valve seat assembly to said control port at or above said predetermined pressure when said supply valve member is seated with said supply valve seat; and
    a bleed orifice communicating said working fluid from said supply port to said control port at a second pressure that is less than said predetermined pressure when said supply valve member is seated with said supply valve seat.

2. A valve assembly as in claim 1 wherein said bleed orifice provides fluid communication from said supply port to said control port when said supply valve member is not seated with said supply valve seat.

3. A valve assembly as in claim 1 wherein said valve seat assembly comprises a smaller diameter section proximal to said supply port and a larger diameter section distal from said supply port, said smaller diameter section being sized to form an annular control chamber radially between said smaller diameter section and said housing control bore, said larger diameter section being sized to circumferentially seal with said housing control bore.

4. A valve assembly as in claim 3 wherein said valve seat assembly further comprises a valve seat assembly bore extending axially into said smaller diameter section, said valve seat assembly bore being truncated by said supply valve seat, wherein said supply valve member is disposed axially between said supply valve seat and a bottom of said housing control bore.

5. A valve assembly as in claim 4 wherein said housing includes a housing supply passage providing fluid communication from said supply port to said valve seat assembly bore.

6. A valve assembly as in claim 5 where said valve seat assembly further comprises a valve seat supply passage extending axially from said supply valve seat to a valve seat control/vent passage extending radially through said valve seat assembly from said valve seat supply passage to said annular control chamber.

7. A valve assembly as in claim 6 wherein said housing includes a housing control/vent passage providing fluid communication between said annular control chamber and said control port such that said working fluid is communicated from said annular control chamber to said control port at or above said predetermined pressure when said supply valve member is not seated with said supply valve seat and such that said working fluid is communicated from said control port to said annular control chamber when said supply valve member is not seated with said supply valve seat.

8. A valve assembly as in claim 7 wherein said housing control/vent passage is spaced radially outward from said housing supply passage.

9. A valve assembly as in claim 6 wherein said housing includes a raised annular ring surrounding said housing supply passage and extending axially away from a bottom of said housing control bore, said valve seat assembly bore being press fit with said raised annular ring.

10. A valve assembly as in claim 6 wherein said valve seat assembly further comprises a valve seat vent passage extending axially through said larger diameter section from said valve seat control/vent passage to a vent valve seat defined by an axial end of said larger diameter section distal from said smaller diameter section.

11. A valve assembly as in claim 10 wherein said valve assembly further comprises a solenoid with a plunger axially moveable between a high pressure position when said solenoid is energized with an electric current and a vent position when said solenoid is not energized with said electric current, said plunger including a supply valve member actuation section which urges said supply valve member off of said supply valve seat in said high pressure position and which allows said supply valve member to seat with said supply valve seat in said vent position.

12. A valve assembly as in claim 11 wherein said supply valve member actuation section extends through said valve seat vent passage and said valve seat supply passage in said high pressure position.

13. A valve assembly as in claim 12 wherein said supply valve member actuation section extends through said valve seat vent passage in said vent position.

14. A valve assembly as in claim 11 wherein said plunger includes a vent valve member which seats with said vent valve seat to prevent fluid communication through said valve seat vent passage in said high pressure position and which unseats with said vent valve seat to allow fluid communication through said vent port in said vent position.

15. A valve assembly as in claim 14 wherein said vent valve member extends radially outward from said supply valve member actuation section.

* * * * *